R. COLLINGSWORTH.
WRENCH.
No. 174,486. Patented March 7, 1876.
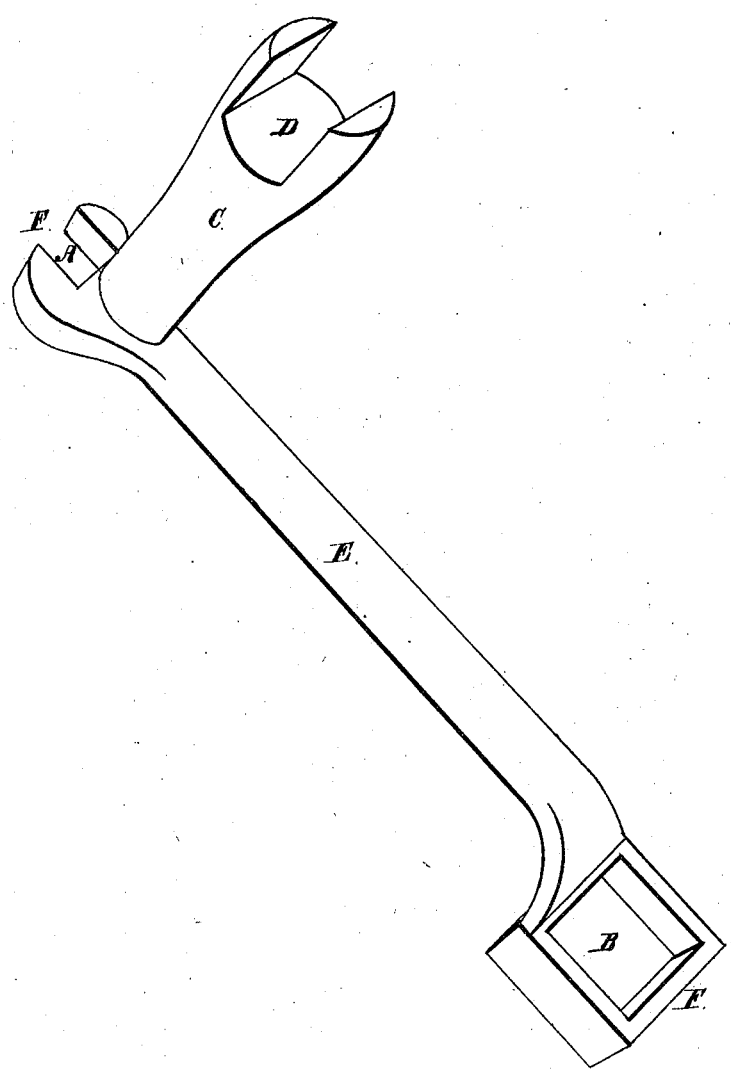
Witnesses:
John F. Wielandy
John Corcoran
Inventor:
Reuben Collingsworth

UNITED STATES PATENT OFFICE.

REUBEN COLLINGSWORTH, OF ST. LOUIS COUNTY, MISSOURI.

IMPROVEMENT IN WRENCHES.

Specification forming part of Letters Patent No. 174,486, dated March 7, 1876; application filed August 23, 1875.

*To all whom it may concern:*

Be it known that I, REUBEN COLLINGSWORTH, of the county of St. Louis, State of Missouri, have invented a new and valuable Improvement in Wrenches; and I do hereby declare that the following is a full, clear, and exact description of the construction and operation of the same, reference being had to the annexed drawing, making a part of this specification, and to the letters of reference marked thereon.

My improved implement is formed by providing an ordinary carriage-wrench with a combined wrench-arm and handle, or arm having its outer end notched to form jaws adapted for engaging nuts of shaft-couplings, and others commonly used in construction of carriages.

The accompanying drawing represents the implement in perspective.

E is the shank of an ordinary carriage-wrench; B, the head or socket, adapted for application to nuts of axle-journals; and F, the head, provided with jaws A, adapted for unscrewing smaller nuts on other parts of vehicles. An arm, C, projects from the shank E at right angles thereto, from a point near the head F, and upon its outer end are formed the jaws D.

Said arm thus constitutes a wrench adapted for use upon the small nuts usually employed in the construction of vehicles, but which are so located that it is difficult or impossible to apply the ordinary wrench. In addition to this function, the arm C acts as a handle for wrench-socket D, thus enabling the shank E to be revolved about the socket as a center, to screw on or unscrew the nuts to which said socket may be applied.

In order to secure the requisite strength and economy in the manufacture of the wrench, I cast the arm C solid with the shank E.

I do not claim a wrench provided with a handle for revolving it about the nut to which it may be applied; but

I claim—

As a new article of manufacture, the wrench formed by the arm C, having jaws D, and the shank E, having a socket, B, said parts being arranged as shown and described, to adapt said arm to its respective functions.

REUBEN COLLINGSWORTH.

Witnesses:
JOHN F. WIELANDY,
JOHN CORCORAN.